May 31, 1938. B. H. LOCKE 2,119,395
EXPANSION PULLEY
Filed Dec. 22, 1936

INVENTOR
Burton H. Locke.

Patented May 31, 1938

2,119,395

UNITED STATES PATENT OFFICE 2,119,395

EXPANSION PULLEY

Burton H. Locke, Lowell, Mass.

Application December 22, 1936, Serial No. 117,173

4 Claims. (Cl. 74—230.18)

My invention relates to improvements in expansion pulleys for use in contacting a belt for transmission of power wherein the contacting surface or rim is varied in diameter to effect changes in the speed element of the transmission; and the objects of the invention are to produce a pulley, that by reason of a novel construction permitting application of a pressure within the pulley to expand same, affords a mechanism that is simple in construction; susceptible to quick, accurate and minute adjustment; and is symmetrically balanced.

In the accompanying drawing:—

Figure 1:
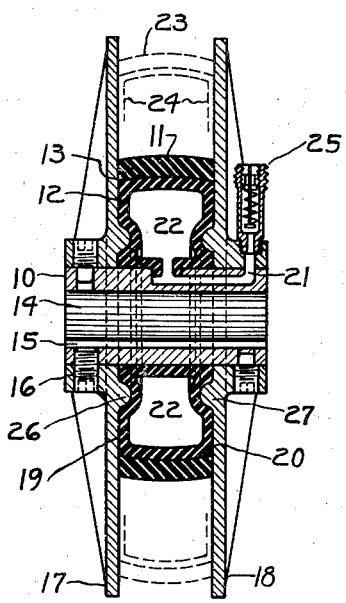
Figure 1 is a vertical section of my improved expansion pulley.
Figure 2:
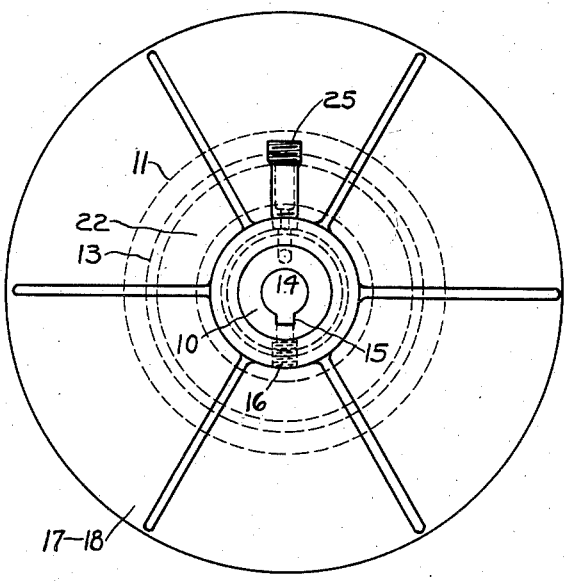
Figure 2 is an end view of the same pulley.

My improved expansion pulley comprises a rigid center section 10, and an expansible outer rim section 11 encircling said center section, and an expansible tube 12 of a suitable tight construction to retain a fluid under pressure, positioned therebetween. Said tube 12 is generally constructed of rubber or a rubber composition, or the like, but could be of any other material suitable to retain a fluid and afford expansion. The outer rim section 11 is preferably constructed of rubber, or a rubber composition, but could be of other suitable expansible structure without departing from the scope of the invention. In some structures it may be found desirable to construct periphery 13 of tube 12 of a reasonably heavy section so as to be suitable to contact a belt, and in such instances it would obviously be feasible to eliminate outer rim section 11.

The center section 11 has an annular opening 14, a keyway 15, and a set screw 16, all of which are utilized for rigidly mounting same onto a shaft, which is common practice in the art.

In the structure shown, there are rigid flanged sections 17 and 18 integral with center section 10, one being positioned on each side of tube 12 to contact side walls 19 and 20, respectively, of said tube for the purpose of retaining same, thus eliminating possible lateral expansion.

An opening 21 is provided in center section 10 and extends inward and connects to chamber 22 within tube 12 to provide a means for insertion of a fluid into said tube under pressure. By proper control of the flow of the fluid to the chamber 22, tube 12 can be expanded any slight degree up to its maximum expansible size. When tube 12 is expanded to its maximum expansible size, the outer rim section 11 would be expanded to the position as shown by broken lines 23, and side walls 19 and 20 of said tube would obviously be stretched and resultantly thinner as shown by broken lines 24. A valve 25 of a construction comparable to that used in an automobile tire inner tube is provided at the outer end of opening 21 for purpose of admitting and retaining the fluid within chamber 22.

The tube 12 is generally held against rotation between said flanges by means of interlocking cooperation with each at 26 and 27.

As a fluid exerts pressure equally in all directions, it is obvious that the outer rim section of the pulley would be expanded symmetrically whenever fluid pressure is applied within the tube, and therefore, a perfectly round and balanced pulley would be afforded.

The term "fluid" is used in this application to mean, "a substance having particles which yield to any force that tends to change its form without a separation of the mass; a liquid or gas" as quoted in the dictionary.

I do not wish to be confined to the exact details as set forth as same are susceptible of modification without departing from the spirit or scope of the invention.

I claim as my invention:—

1. An expansion pulley comprising a rigid center section, an expansible outer rim section to contact a belt and an expansible tube therebetween, a rigid flange section contacting each side of said tube being integral to said center section and extending outward therefrom beyond said outer rim section, means for injecting and retaining a fluid in said tube for the purpose of distending same to expand said outer rim section.

2. An expansion pulley comprising a rigid center section, an expansible tube encircling said center section, the outer peripheral surface of said tube being expansible and of a suitable structure to contact a belt, a rigid flange section contacting each side of said tube being integral to said center section and extending outward therefrom beyond said peripheral surface, means for injecting and retaining a fluid in said tube for the purpose of distending same to expand said peripheral surface.

3. An expansion pulley as described in claim 1, with means for controlling the flow of fluid to said tube.

4. An expansion pulley as described in claim 2, with means for controlling the flow of fluid to said tube.

BURTON H. LOCKE.